April 8, 1924.  
L. H. VOSS  
METHOD OF MAKING BLOW-OUT SHOES  
Filed Dec. 17, 1921   2 Sheets-Sheet 2

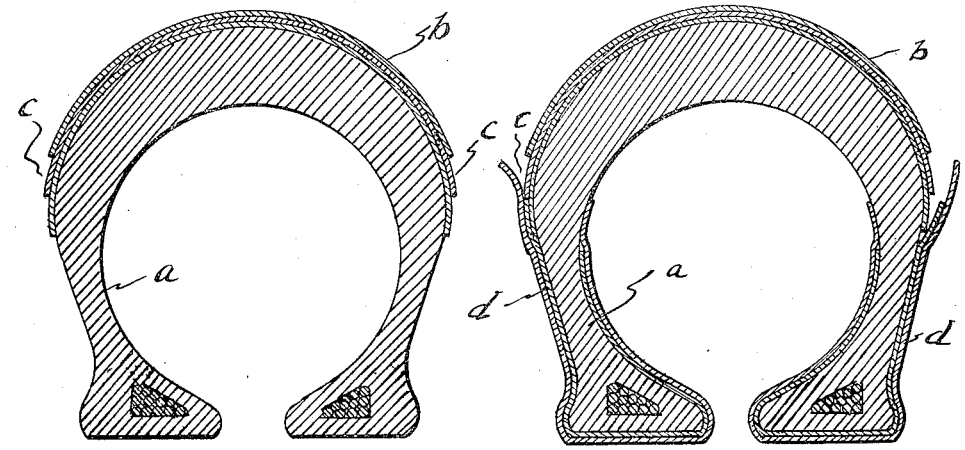
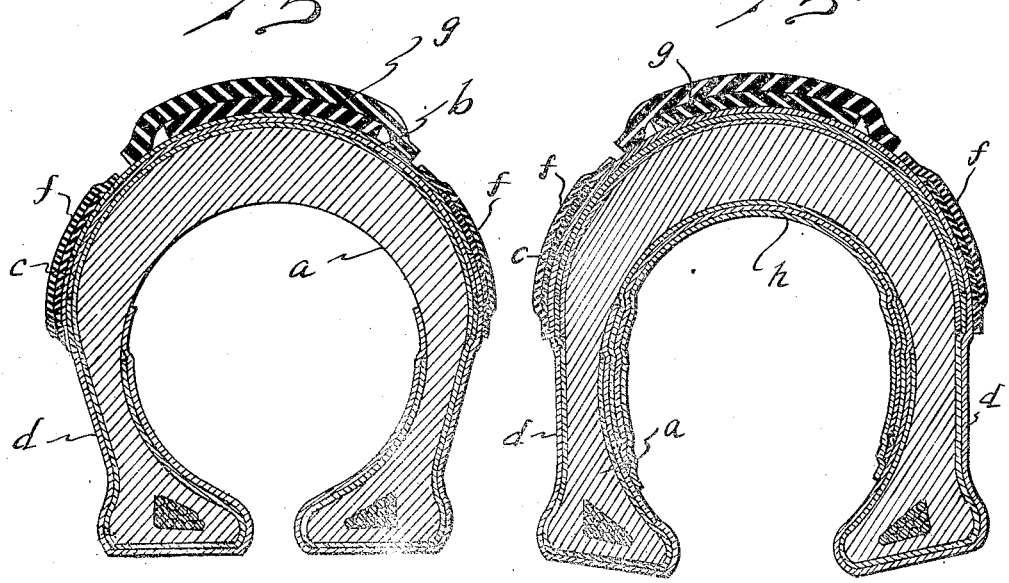

1,489,867

INVENTOR.  
Louis H. Voss  
BY  
ATTORNEY.

Patented Apr. 8, 1924.

1,489,867

UNITED STATES PATENT OFFICE.

LOUIS H. VOSS, OF DETROIT, MICHIGAN.

METHOD OF MAKING BLOW-OUT SHOES.

Application filed December 17, 1921. Serial No. 522,999.

*To all whom it may concern:*

Be it known that I, Louis H. Voss, a citizen of the United States, residing at Detroit, in the county of Wayne and State of Michigan, have invented certain new and useful Improvements in Methods of Making Blow-Out Shoes, of which the following is a specification.

This invention relates to blow out shoes for pneumatic tires. It has for its object a blow out shoe which is built on a live tire as a core. This live tire is preferably one of precisely the same construction as the tire on which the blow out shoe is intended to be used. Consequently the blow out shoe is nicely molded to accurately fit the tire on which it is intended to be used. The claims are directed to both the article itself and the method by which it is made.

In the drawings,—

Fig. 1 is a cross section showing a casing with the first material in place.

Fig. 2 is a similar view showing the blow out shoe a step further along in construction.

Fig. 3 is a similar view showing the work at the third step.

Fig. 4 is a similar view showing the work when it has been all assembled together and is in position to be put in the vulcanizer, the sides are spread to let in the inner boot.

Figures 5, 6, 7:
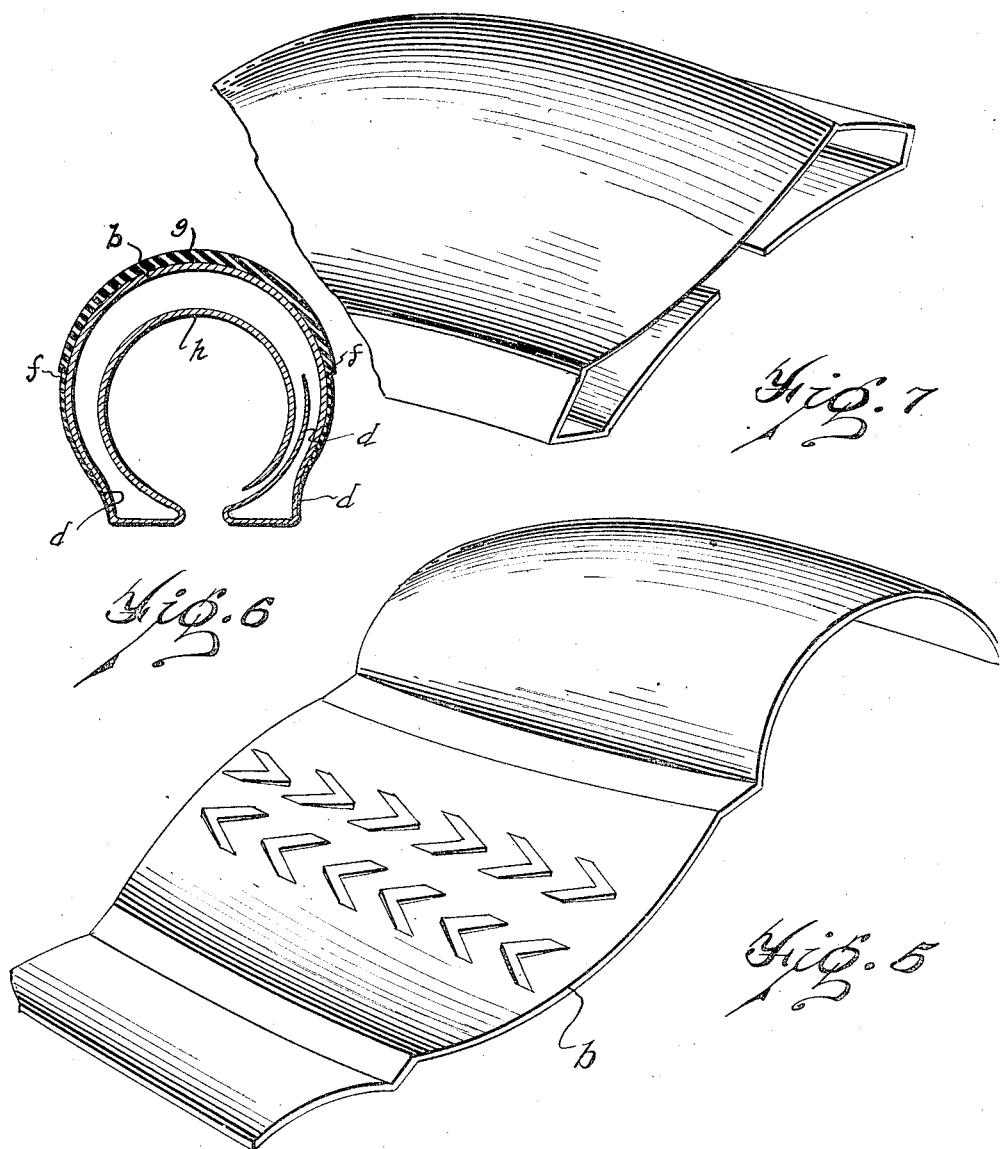
Fig. 5 is a perspective showing the shoe when it is completed.
Fig. 6 is a section showing the completed shoe.
Fig. 7 is a perspective showing a modified form of shoe.

$a$ designates the outside casing of a pneumatic tire. Several plies of tire fabric which are scarfed as at $c$ on both sides are placed over the thread of the casing. Preferably these several plies of tire fabric are vulcanized together and are shaped to the radius of the casing. The best and cheapest way of securing fabric material for this purpose is to cut a section out of an old casing of the same size as the casing on which the shoe is being made.

The sides of the casing, the inside of the bead and also the inside of the casing at the sides are painted with a non-vulcanizing cement. Thereupon two plies of raw fabric designated $d$ are placed upon the sides of the outside of the casing, over the inside of the bead and on the sides of the inside of the casing, as is clearly shown in Fig. 2. These plies are of different length to form scarfed ends to match with the scarfed ends of the fabric $b$ and also the fabric to be placed on the inside of the casing. This raw fabric is simply fabric impregnated with uncured rubber gum. This in itself is quite sticky and will easily stick to the cement on the sides of the tire, on the inside of the bead, and on the inside of the casing. In order to properly form and stretch it to the casing, it is stitched, that is, a stitching tool comprising a disk-like roller is run over the raw fabric, stretching parts of it to accommodate it to the configuration of the casing and thereby avoid all wrinkling and puckering.

After this operation a couple of strips of what is called cushion gum, designated $f$, are applied over the seam where the scarfed ends of the outside boot $b$ and the side fabric come together. Over the tread of the cured fabric $b$ a pair of thick rubber strips called tread gum, designated $g$, are applied. This cushion gum and tread gum is of relatively sticky material and will adhere in place without any cement. This cushion gum may also be applied to the ends of the uncured fabric at the sides of the casing and also to the ends of the tread gum plies. However, this is not absolutely essential and hence is not illustrated.

The casing is pried apart with any suitable form of spacer and one of the flaps on the inside of the casing formed by the two plies of uncured fabric is painted with a vulcanizing cement. Thereafter, in one form of my invention I place a piece of plural ply cured fabric $h$ on the inside and cause it to adhere to the cemented flap. I will call this fabric the inside boot, while the cured fabric on the outside which is designated $b$ will be called the outside boot. This inside boot is preferably a piece of a casing carcass taken out of a similar tire and which has its end scarfed to form a suitable scarfed joint with the flap of the side fabric.

The casing, together with the elements that go to make up the blow out shoe, are now placed in a vulcanizing mold. Suitable means are provided for securing the boot and casing within the mold. Suitable heat may now be applied to the mold by steam, electric coils, coal, or any other source of heat. The casing, together with the elements of the shoe, are left within the mold a suitable length of time to properly vulcanize, which will be about one hour, more or less.

The tire together with the completed shoe is now withdrawn from the mold, and the shoe may be pulled off from the casing as it only sticks to the casing by the non-vulcanizing cement which will permit it to be torn off.

The completed article is a shoe of the type shown in Fig. 5. If the casing used as the core has a non-skid tread, the protruding portions of the tread will be imprinted on the inside of the boot, as shown in Fig. 5. Hence when the shoe is fitted over a tire of similar make and size, these indentations in the outside boot will fit nicely over the non-skid projections on the tire and consequently key the shoe to the tire so it cannot creep around the periphery of the tire. When the shoe is to be used on a non-skid tire, it is sometimes preferable to place one or more layers of tread gum on the inside of the boot. This will give a rubber coating in which the non-skid projections of the casing may indent into the rubber. However, even without a rubber ply on the inside and outside rubber boot, the figures of the non-skid tread will be impressed into the fabric as shown in Fig. 5.

This Fig. 5 represents a blow out shoe which has both an outside and an inside boot. This blow out shoe hence is held both on the inside and outside of the tire and is pinched between the bead of the tire and the rim.

In Fig. 6 a single boot shoe is shown. Only the outside boot is used here but the flaps are deep flaps that are molded over the bead and turn up into the inside of the casing so that the shoe is firmly pinched on the inside of the tire and between the bead and rim so that there is practically no chance of its creeping. Of course, in this form of construction only the outside boot chiefly resists the pressure of the air inside of the tire.

I am aware that it is not broadly new to construct a double boot blow out shoe. However, I do not believe that anybody has ever heretofore constructed a shoe which has been built up with the tire casing as a core so as to mold it precisely to the tire on which it is intended to be used so the fit is as accurate as can be. It is only when the blow out shoe has a molded fit of this kind that it is of any value on the outside of the tire for obviously a shoe that cannot be drawn tightly over the tire is of practically no value to resist the blowing out pressures and it will also pick up all manner of dirt and water between the shoe and the tire.

These shoes can be made for all makes and sizes of tires. One can call for a "Firestone" blow out shoe or a "Goodyear" blow out shoe in the same way that he asks for a replacement of his tire. They can be manufactured at a cost approximating one-half the price of a so-called section which is set and secured directly into the tire carcass itself. The double boot shoe has all the advantages and strength of such a set-in section.

The plural ply fabric used to form the outside boot and inside boot will be preferably part of an old tire carcass. However, it can be built up with raw fabric as the sides of the shoe are, and hence I desire it to be understood that this comes within the claims unless otherwise restricted.

What I claim is:

1. The method of building a blow out shoe, comprising the laying of one or more strips of fabric over the tread of a casing, stitching fabric over the sides of the casing, over the inside of the bead and onto the sides of the inside of the casing, applying rubber strips to said fabric, and vulcanizing the same together on a tire casing as a core to form a blow out shoe which may be separated from the core when the vulcanizing has been completed.

2. The method of building a blow out shoe which comprises the laying of fabric strips suitably scarfed at their sides over the tread of a tire casing acting as a core, the stitching of raw fabric suitably scarfed at their sides on the sides of the casing, over the inside of the bead and on the sides of the inside of the casing, applying rubber strips to the tread and to the joint between the raw fabric and the fabric over the tread, and vulcanizing the fabric and rubber together to form a separable blow out shoe made upon the tire casing as a core.

3. The method of building a blow out shoe which comprises the laying of fabric over the tread, the stitching of a raw fabric over the sides of a tire casing, over the bead and on the sides of the inside of the casing, the applying of a gum strip on the joint of the side fabric with the tread fabric, and the placing of the whole in a mold wherein the casing forms a core, and vulcanizing the same to form a separable blow out shoe.

In testimony whereof I affix my signature.

LOUIS H. VOSS.